Jan. 21, 1964   E. P. BULLARD III, ET AL   3,118,345
TOOL SPINDLE DRAWBAR
Filed Aug. 10, 1961

FIG. 1

FIG. 2

INVENTORS.
EDWARD P. BULLARD III
EDWARD P. BULLARD IV
BY
ATTORNEY

United States Patent Office 3,118,345
Patented Jan. 21, 1964

3,118,345
TOOL SPINDLE DRAWBAR
Edward P. Bullard III and Edward P. Bullard IV, Fairfield, Conn., assignors to The Bullard Company, Bridgeport, Conn., a corporation of Connecticut
Filed Aug. 10, 1961, Ser. No. 130,614
1 Claim. (Cl. 90—11)

The present invention relates to machine tools and particularly to a new and improved drawbar for locking and releasing a tool within a tapered bore of the spindle of a machine tool.

The principal object of the invention is to provide a drawbar for the spindle of a horizontal boring, drilling and milling machine including means for releasably securing a tool arbor, or similar device, in the receiving aperture or socket of the spindle so that it may be quickly and easily inserted into, or removed from, the spindle.

Another object of the invention is to provide such a drawbar that is power operated.

Still another object of the invention is to provide such a drawbar in which a "bayonet" connection is employed between the tool and one end of the drawbar.

In one aspect of the invention, a spindle of a machine tool may be provided with a tapered bore or socket for the reception of a tapered shank of a tool. The tool may include a flange at the end of the tapered shank of largest diameter, and it may include diametrically opposed keyways that cooperate with diametrically disposed keys on the free end of the spindle. The rear end of the tapered shank may be axially drilled and tapped for threadingly receiving an adapter screw having a pin extending through it transversely.

In another aspect of the invention, a drawbar may be reciprocably mounted within an axial passage extending through the spindle. The forward end of the drawbar may be axially drilled and tapped to threadingly receive a drawbar locking member which forms a "bayonet" connection with the transverse pin in the adapted screw within the end of the tool shank. A locking nut may lock the locking member in adjusted position and it may be provided with external splines or keys that slide within internal splines or keyways in a bushing fixed within the axial passage of the spindle.

In still another aspect of the invention, the spindle may have fixed to it a cylinder within which a piston reciprocates and which piston is connected to the rear end of the drawbar. With the piston in its forward position within the cylinder, the adapted at the front end of the drawbar will be in position to receive the adapter screw of the tool such that the "bayonet" connection can be effected and the keyways in the tool flange will line up with the keys in the front end of the spindle. Upon applying pressure liquid to the forward side of the piston, it moves rearwardly, drawing the tool into proper position with the keys within the keyways. Movement of the piston to its forward position causes the forward end of the adapter to abut the rear end of the tool shank, releasing it from the tapered bore of the spindle.

The above, other objects and novel features of the power-operated drawbar will become apparent from the following specification and accompanying drawing which is merely exemplary.

In the drawing:

FIG. 1 is a sectional view of a spindle of a machine tool including a drawbar to which the principles of the invention have been applied; and FIG. 2 is a view looking in the direction of the arrows along line 2—2 of FIG. 1.

Referring to FIG. 1, the principles of the invention are shown as applied to a spindle 10 of a machine tool having a bore 11 extending along the longitudinal axis of the spindle 10. The bore 11 may be counterbored at 12, 13 and 14, forming shoulders 15, 16 and 17. The forward end of spindle 10 may be provided with a tapered bore 18 for the reception of a tapered shank 19 of a tool 20, all of usual construction.

The tool 20 may include a flange 21 having diametrically opposed keyways 22 therein (see FIG. 2) adapted to cooperate with diametrically disposed keys 23 fixed to the forward end of the spindle 10. The keys 23 may be provided with chamfered edges 24 so as to cause the keyways 22 to register easily with them.

The rearward end of the tapered shank of tool 20 may be provided with a threaded bore 25 along the longitudinal axis of the tool 20 for threadingly receiving an adapter screw 26 having a lock nut 27 thereon for adjustably locking screw 26 in a predetermined axial position for a purpose to be described later. The adapted screw 26 may include a pin 28 extending transversely therethrough and beyond each side wall thereof.

A drawbar 29 may be slidingly received within the bore 11 of the spindle 10. The forward end of the drawbar 29 may be provided with a threaded hole 30 extending along the longitudinal centerline of bar 29 for threadingly receiving the shank 31 of an adapter 32. The adapter 32 may comprise one portion 33 of a "bayonet" connection that cooperates with the transverse pin 28 to complete the "bayonet" connection between the tool 20 and the drawbar 29. Between the threaded end of shank 31 and the adapter 32 may be a collar 34 having external splines formed about its outer periphery adapted to mate with internal splines within a bushing 35 that is pressed into counterbore 14 against shoulder 17. A bearing bushing 36 may be pressed into counterbore 13 against shoulder 16; and another bearing bushing 37 may be pressed into counterbore 12 against shoulder 15.

The rear end of drawbar 29 may be fixed to a piston 38 within a cylinder 39, and a compression spring 40 surrounding bar 29 may be located between the rear end of bushing 37 and the lefthand face of piston 38 for a purpose to be described later.

Fluid under pressure from a supply line 41 may be supplied to either side of piston 38 through a valve 42 by the energizing of a solenoid 43. In the condition of the parts shown in FIG. 1, pressure fluid is forcing the piston 38 rightwardly, locking the tool 20 to the spindle 10. Energizing solenoid 43 will exhaust the left side of piston 38 and apply pressure fluid to the right side thereof. When this occurs, the drawbar moves leftwardly such that the left end of adapter 32 abuts against the lock nut 27 before pin 28 contacts the rear surface 44 of the recess of the portion 33. This drives the tool 20 outwardly to a point where the right side of flange 21 is spaced leftwardly from the left face of keys 23. Accordingly, the tool 20 may be rotated sufficiently to disengage the pin 28 from the portion 33 so that the tool can be withdrawn.

To apply another tool to the spindle, the adapter 32 will be in its leftmost position. This will permit inserting the tapered shank of the tool and turning it so that its pin 28 seats against surfaces 45 (only one being shown) within portion 33 which ensures the alignment of the keyways 22 with the keys 23, and with a slight spacing between the right side of flange 21 and the lefthand face of keys 23. Upon de-energizing solenoid 43, pressure fluid forces piston 38 rightwardly, drawing the tool into locked position within the tapered bore 18 of spindle 10. The chamfer 24 on the edges of the keys 23 ensures proper register between them and the keyways 22 within the flange 21. The spring 40 ensures a locked condition of the tool 20 in spindle 10 in the event a failure occurs within the fluid-operated system.

Although the various features of the power-operated drawbar have been shown and described in detail to fully disclose one embodiment of the invention, it will be evident that changes may be made in such details and certain features may be used without others without departing from the principles of the invention.

What is claimed is:

Apparatus comprising a spindle for a machine tool having an axial bore therethrough and a tapered socket at one end thereof for the reception of the tapered shank of a tool having a transverse pin extending therethrough and beyond the side walls thereof, said tool including a flange at the end of said shank adjacent the maximum diameter of its tapered portion; keyway means in said flange adapted to cooperate with key means on the face of the free end of said spindle; a drawbar slidably mounted within said bore; an adapter connected to the one end of said drawbar, said adapter having a portion adapted to form a rigid, non-flexible "bayonet" connection with the transverse pin of said tool; a cylinder connected to said spindle; a piston within said cylinder and connected to said drawbar; means for supplying pressure fluid to said cylinder on each side of said piston while exhausting said cylinder on the opposite side of said piston; means within said bore for preventing the rotation of said drawbar; and resilient means within said bore and acting on said piston.

References Cited in the file of this patent

UNITED STATES PATENTS

| | | |
|---|---|---|
| 1,961,129 | De Haas et al. | June 5, 1934 |
| 2,860,547 | Stephan | Nov. 18, 1958 |